United States Patent [19]

Müller

[11] 4,338,348

[45] Jul. 6, 1982

[54] ISOMERIZATION OF ALPHA ACIDS

[76] Inventor: Adam Müller, St. Johann, Hallertau, Fed. Rep. of Germany

[21] Appl. No.: 194,120

[22] PCT Filed: Jun. 19, 1979

[86] PCT No.: PCT/DE79/00058

§ 371 Date: Oct. 31, 1979

§ 102(e) Date: Oct. 31, 1979

[30] Foreign Application Priority Data

Jun. 20, 1978 [DE] Fed. Rep. of Germany ....... 2827002
Jul. 4, 1978 [DE] Fed. Rep. of Germany ....... 2829308
May 22, 1979 [DE] Fed. Rep. of Germany ....... 2920765

[51] Int. Cl.$^3$ ................ C12C 3/00; C12C 9/02; A23L 1/221
[52] U.S. Cl. ................ 426/600; 426/16; 426/651; 426/429; 426/430
[58] Field of Search ............. 426/16, 600, 651, 429, 426/430, 592

[56] References Cited

U.S. PATENT DOCUMENTS

| | | | |
|---|---|---|---|
| 3,044,879 | 7/1962 | Koch et al. | 426/600 |
| 3,433,642 | 3/1969 | Nakayama et al. | 426/600 X |
| 3,939,281 | 2/1976 | Schmengers | 426/429 X |
| 4,154,865 | 5/1979 | Grant | 426/600 |
| 4,212,895 | 7/1980 | Lams et al. | 426/600 |
| 4,218,491 | 8/1980 | Lams et al. | 426/600 |

FOREIGN PATENT DOCUMENTS

| | | |
|---|---|---|
| 987250 | 4/1976 | Canada . |
| 2377448 | 1/1977 | France . |
| 2398799 | 7/1977 | France . |
| 1246425 | 9/1971 | United Kingdom . |
| 167798 | 5/1965 | U.S.S.R. . |

OTHER PUBLICATIONS

Lams et al., Preparation of Hop Extracts Without Using Organic Solvents, J. Inst. Brem., 1977, vol. 83, (pp. 39–40).
Aleksandrov et al., Induence of Temperature and Pressure During Liquid Carbonic Acid Extraction, Chemical Abstracts, vol. 73: 80397e, 1970, (p. 221).
Lams et al., Production of Solvent-Free Isomerized Extracts, J. American Soc. Brew. Chemist., vol. 35, No. 6, 1977, (pp. 187–191).
Knorr et al., Chemie und Technologie des Hopfens, Verlag Hans Carl Nürnberg, 1972, (p. 86).

*Primary Examiner*—David M. Naff
*Attorney, Agent, or Firm*—Ladas & Parry

[57] ABSTRACT

Isomerization of alpha acids contained in hop extracts obtained with liquid or fluid $CO_2$ or organic solvents is carried out by mixing the extract with one or more adsorption agents and treating the resulting mixture in a closed pressurized container with fluid $CO_2$ under a pressure greater than 50 bars and at a temperature greater than 33° C. to form iso-alpha acids. During isomerization in the container, essentially no iso-alpha acids become dissolved in the fluid $CO_2$ and the iso-alpha acids are removed from the container as a dry substance. Adsorption agents that may be used are bentonite, fuller's earth, and alkali and alkaline earth metal salts or oxides.

14 Claims, 1 Drawing Figure

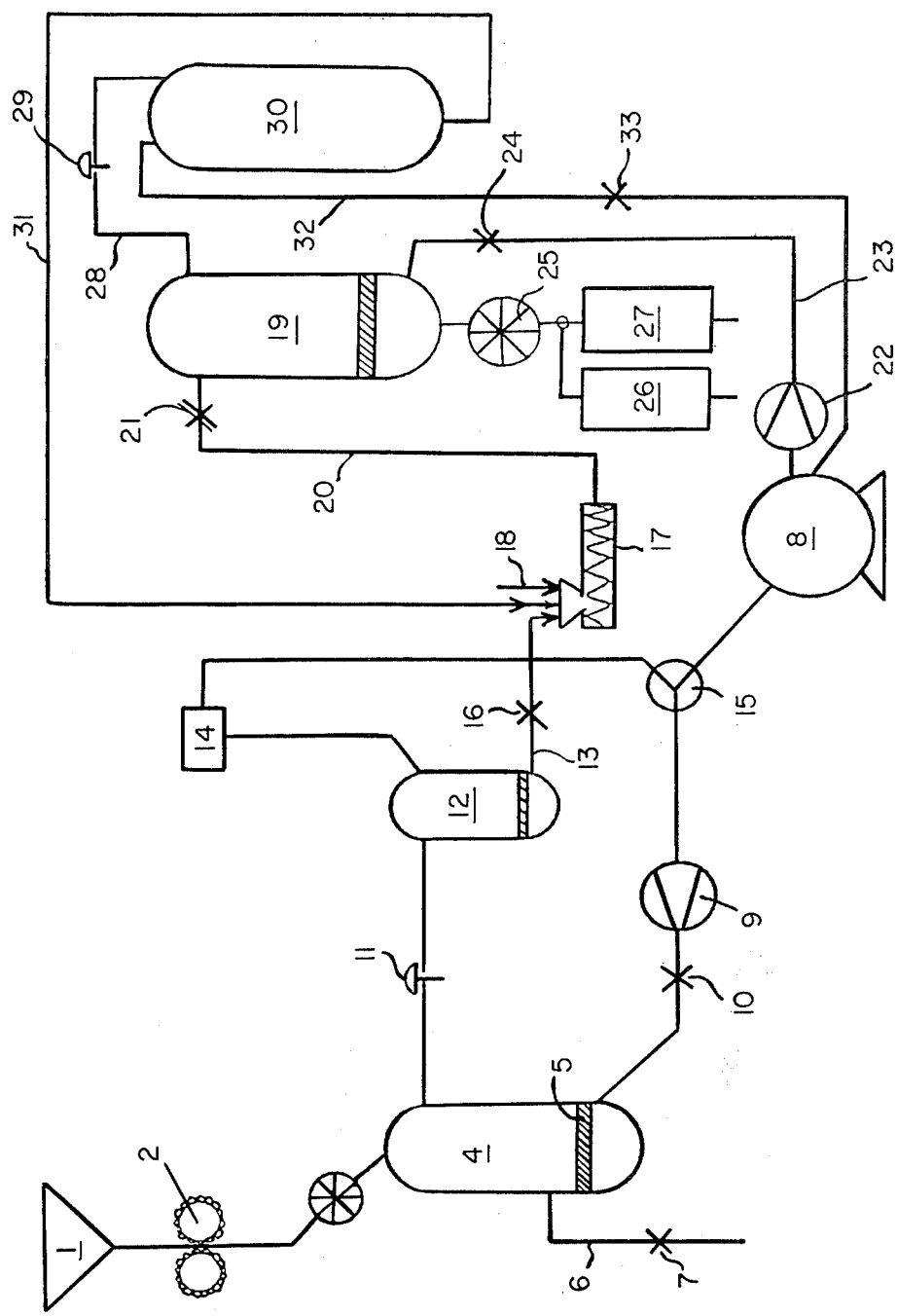

ISOMERIZATION OF ALPHA ACIDS

The invention relates to a process for the treatment of hops or hop products by the use of $CO_2$ as extraction agent and subsequent separation of the resulting extract by evaporation of the $CO_2$. Oestrogen-active substances can be isolated from the extract thus obtained or the alpha acids contained in this extract can be isomerised.

By hops is meant here the hop cone both in the freshly harvested state and in the redried commercial state and by hop products are meant products such as, for example hop powder, lupulin-enriched hop powder in the form of pellets, hop extracts and hop extract powder.

Processes for obtaining hop extracts are carried out in the conventional way by means of organic solvents and water. However, these solvents dissolve not only the desired extract from the starting material, but also undesirable substances. It is also not possible to prevent residues of the solvent from passing into the extract, which is undesirable for foodstuff purposes.

Furthermore, it is known to effect extractions by means of liquid gases, especially by means of $CO_2$, due to which the above-described attendant phenomena are forestalled or at least occur only to a small extent, but it is not possible to prevent chlorophyll-like substances and higher molecular polyphenols from passing into the extract.

The problem of the invention is to prepare an extract of hops or hop products which contains virtually all bitter substances and of the polyphenols the desired proportion of low-molecular polyphenols and which also contains virtually all components of the hop oil. According to an advantageous form of realisation of the invention, oestrogen-active substances can be isolated from the extract by isolation methods known per se. Moreover, according to an especially advantageous form of realisation of the process, the extracts enriched in alpha acids can be subjected to an isomerisation process.

This is achieved according to the invention due to the fact that to obtain resins, hop oils and low-molecular polyphenols the $CO_2$ is used in a temperature range up to its critical temperature and a pressure range over its critical pressure and sub-critical temperature conditions and supercritical pressure conditions are maintained during extraction.

The hop resins and hop oils are valuable constituents of the hop or hop products, as are also up to a certain proportion the low-molecular polyphenols. Furthermore, also oestrogen-active substances are present in the hop resins.

The critical temperatures and pressures mentioned here refer, for the pure $CO_2$ introduced to this $CO_2$ itself, whereas these concepts relate in the pressurised container to the enriched gas whose critical temperature and critical pressure are different from those of pure $CO_2$, since they depend, for example on the ratio of concentrate to $CO_2$.

In principle, any other liquefiable gas can be used instead of $CO_2$, such as, for example $N_2O$, but $CO_2$ is the most readily available and is relatively harmless and its critical temperature and critical pressure lie in a range which can easily be controlled industrially.

According to a preferred form of realisation of the invention, the proportion of extracted low-molecular polyphenols can be increased due to the fact that the extraction is effected with water as entrainer. In certain beer preparation processes a larger proportion of low-molecular polyphenols is desired, since a certain stability in relation to taste and storability is thereby achieved.

An indication of the proportion of low-molecular polyphenols is given by the P.I. index by which is meant the quotient of polyphenols and anthocyanogens. In other words, the level of the polyphenol index is an indicator of the degree of polymerisation or condensation of the polyphenols. Whereas with cone hops and hop powders the P.I. lies conventionally between 1.2 and 1.5 and with the hop extracts prepared by organic solvents and water it lies between about 2.5 and 4.5, it was found surprisingly that by the process according to the invention a P.I. of 1 and even substantially less, for example 0.1, can be achieved. This means that the proportion of low-molecular polyphenols relative to the total polyphenols is larger than in any known hop product.

It is known that natural hops contain oestrogen-active substances. The recovery of oestrogen-active substances from natural hops is possible, but it has hitherto been possible to effect only in the laboratory. The attempt to obtain oestrogen-active substances from commercial hop extracts has failed hitherto despite many tests. These tests were conducted both on commercial hop extracts obtained by a solvent extraction process and also on hop powders or enriched hop powders obtained by dry methods.

It has now been shown surprisingly that the extract obtained by this process still contains considerable quantities of oestrogen-active substances which can be obtained from this extract. Although the reason why this particular extract contains oestrogen-active substances has not been explained, it may be assumed that the oestrogen-active substances are undamaged due to the treatment with fluid gas effected at low temperature.

Separation of the oestrogen-active substances from the extract can be effected by means of a conventional ether extract, although also chromatographic or electrophoretic separating processes can be applied.

The oestrogen-active substances thus obtained can be added as protein-synthesising substances to feedstuffs or as active ingredients to cosmetic agents or they are suitable as bath additives.

According to a preferred form of realisation of the invention, further processing is effected by chromatographic processes using sephadex or sepharose. Also extraction with ether is possible.

The extract prepared according to the process contains an unusually high proportion of alpha acids which are essential carriers of the bitter substances, but these alpha acids are not soluble in water or beer and are dissolved in the wort or in the beer only in the form of iso-alpha acids. In general, isomerisation of the alpha acids into iso-alpha acids is effected during boiling of the wort. The yield in this recovery of the iso-acids is, however, unfavourable and the loss of bitter substances during beer preparation is very high.

Isomerisation of the alpha acids is now effected by mixing the hop products containing alpha acids with one or more adsorption agents and by treating them dry in a closed pressurised container at elevated temperature with fluid $CO_2$ under pressure and by removing from the pressurised container the dry iso-alpha acids thus obtained and optionally treating them further and purifying them.

By hop products containing alpha acids are meant in this connection all products which contain alpha acids in an accessible way. Considered as inaccessible are the lupulin seeds contained in hop cones with intact cuticula as well as intact lupulin seeds themselves.

Alpha acids are designated as accessible as soon as the lupulin seeds of the hop are present in crushed, ground or pressed form, such as e.g. in the form of hop powder or pellets, or, after treatment with water or steam, in a split state.

The alpha acids are accessible especially when they are present in the form of extracts such as e.g. extracts obtained by organic solvents or extracts obtained by liquid or fluid $CO_2$.

If the extract is prepared by $CO_2$ as solvent at sub-critical temperature and super-critical pressure, the especial advantage is afforded that the iso product obtained contains practically no undesirable nitrates.

The unusually high and undesirable nitrate content in hops and hop products is then reduced down to small remains, as shown by the following figures:

The nitrate content of 100 g of product is on average for:

| | |
|---|---|
| Hop (Hallertau medium-early harvest 1977) | 900 mg |
| Hop extract Dichloromethane extract + water extract, mixture ratio 1:1 | 1200 mg |
| Regular hop powder | 850 mg |
| Lupulin-enriched hop powder | 550 mg |
| Pure resin extract (hexane extract) | 200 mg |
| $CO_2$ hop extract prepared with super-critical $CO_2$ (super-critical relative to pressure and temperature) | 180 mg |
| $CO_2$ hop extract prepared with sub-critical $CO_2$ (sub-critical relative to pressure and temperature) | 160 mg |
| Hop extract prepared with $CO_2$ (sub-critical relative to temperature, super-critical relative to pressure) | 15 mg |

The quantities of nitrate were determined according to Postel (Brauwissenschaft 1976, pages 39 to 43).

Adsorption agents within the meaning of this invention are all conventional adsorbents such as e.g. activated charcoal, activated aluminium oxide, fuller's earth, bentonite, silica gel, kieselguhr, etc.; furthermore, the alkali and alkaline-earth salts or oxides which are known for the isomerisation of alpha acids and which are retained on the accessible alpha acids by adhesion. These include especially $Na_2CO_3$, $K_2CO_3$, $MgCO_3$, $CaCl_2$, calcium oxide and magnesium oxide.

Adsorption agents within the meanings of this invention are also the hydrides active as reducing agents, such as e.g. sodium borohydride, potassium borohydride, calcium hydride or magnesium hydride, which are likewise retained on the accessible alpha acids initially by adhesion.

By fluid $CO_2$ is meant $CO_2$ whose temperature lies above the critical temperature (t crit. 33° C.) and whose pressure lies both below the critical pressure (p crit. 73 bars), but primarily above the critical pressure and which is situated in a closed pressurised container.

By elevated temperature is meant a working temperature in the pressurised container of over 33° C. Better yields are obtained with temperatures above 80° C., preferably between 90° and 110° C.

The isomerisation itself can be effected at pressures of more than 50 bars, but pressures between 200 and 350 bars are recommended. The tests conducted have shown that good results are still achieved at pressures of 600 bars and above, but working at such pressures is relatively expensive.

An especial form of realisation of the invention consists in reducing the isomerised alpha acids in order to use these reduced iso-alpha acids to prepare beer stable in light.

The process according to the invention is carried out as follows:

Firstly, the alpha acids present in accessible form are mixed or triturated with one or more adsorption agents in the weight ratios described below.

Depending on the consistency in which the product containing accessible alpha acids is present, for example with a powdery quality of all the mixture components, an intensively working mixing appliance is appropriately used, while with a pasty or syrupy quality of one or more mixture components a kneader for trituration is preferred.

The moisture content of the individual mixture components which also include the content of solvent residues can vary from 0% to the respective own weight of the substances used, that is the weight of moisture can be equal to the weight of the substance and have a magnitude up to the total weight of the respective mixture (relative to dry substance).

The mixture ratio of the adsorption agents used to the accessible alpha acids is of an order of magnitude between 1:0.01 and 1:10, that is 0.01 to 10 parts of accessible alpha acids to 1 part by weight of adsorption agent. A ratio of 1:0.1 to 1:1 is especially appropriate, all the quantity data being related to dry substance. A further adsorption agent in the form of a reducing agent, for example a borohydride, preferably sodium boranate or an alkaline-earth hydride, preferably calcium hydride or magnesium hydride may be added to the above mentioned conventional adsorption agents, the weight ratio of the further adsorption agent alone or together with the conventional adsorption agents to the alpha acids of the hop or hop products being 1:0.01 to 1:10, preferably 1:0.1 to 1:1.

The mixture of adsorption agents and accessible alpha acids is poured into a pressurised container and treated for at least 5 minutes up to several hours in the closed container with fluid $CO_2$ at a pressure of more than 50 bars and a working temperature of more than 33° C.

The treatment time in the closed pressurised container is dependent on the quantity of accessible alpha acids used and on the quantity of flow of fluid $CO_2$. The treatment time is also dependent on the type of pretreatment of the accessible alpha acids. Thus, for example isomerisation takes place in the closed pressurised container, under otherwise identical conditions, from the hop extracts prepared with $CO_2$ as solvent substantially more rapidly than isomerisation from hop powders or pellets.

The treatment according to the invention of a mixture of adsorption agents and accessible alpha acids in a closed pressurised container is designated here as "dry treatment", in contrast to the known isomerisation processes in which work is generally carried out in strongly diluted solutions.

This dry treatment includes moisture contents of the mixture components of 0% up to the own weight of the substances used (relative to dry substance).

It was surprising to find that according to the process of the invention with fluid $CO_2$ not only the isolation of individual ingredients such as e.g. alpha acids, beta acids, etc. from hop products was effected; but a genuine chemical reaction such as that of the isomerisation of the alpha acids was achieved.

This isomerisation action by fluid $CO_2$ which behaves quite differently from liquid $CO_2$ is displayed by the following features:

Whereas, for example under the conditions unfavourable for isomerisation with $CO_2$, such as low pressure in the pressurised container (under 50 bars) and low temperature (under 30° C.) with otherwise identical starting substances, the alpha acids are dissolved by the liquid $CO_2$ in the extraction container and are precipitated again by pressure reduction in the expansion container, in the use of fluid $CO_2$ virtually no dissolving, no transport and no re-precipitation of the iso-alpha acids in the expansion container take place. The iso-alpha acids obtained by the process according to the invention remain in the extraction container and after completion of isomerisation are taken thence as dry substance which has, as a rule, the moisture contained in the dry substances. This applies also when a starting material enriched with water or even water itself has been used as entrainer for pressure treatment.

In working under non-optimal isomerisation conditions it happens that in addition to the resulting iso-alpha acids a small proportion of alpha acids and other hop resins are dissolved in fluid $CO_2$ in the extraction container and are transported into the expansion container where they are precipitated. These bitter hop substances contain practically no iso-alpha acids and they are not lost at all, but are available again completely for the next isomerisation operation.

The iso-alpha acids taken from the pressurised container can, if pure hop resin extract, as obtained, for example by $CO_2$ extraction, is used as starting product, be added directly to the finished beer with the adsorbents activated charcoal, activated aluminium oxide, fuller's earth, bentonite, silica gel or kieselguhr in pulverised, granulated or pelleted form.

If salts of alkali or alkaline-earth metals have been used as adsorbents and the above-defined hydrides in combination with impure resin extracts such as e.g. hop extracts prepared with organic solvents or hop powders have been used as reducing agents as starting products for isomerisation, repurification of the crude isohumulons obtained is appropriate. This repurification can be effected by means of known methods of gel or ion-exchanger chromatography and the purified isohumulon can be added to the finished beer directly or after mixing with known adsorption agents such as e.g. bentonite, fuller's earth, silica gel or kieselguhr, optionally in the form of granulates or pellets.

A surprising feature of the process according to the invention is the unusually high yield of iso-alpha acids in the isomerised extract which can amount under favourable process conditions to 96%. In addition, an optimal utilisation of this iso extract in the bittering of beer of over 90% is achieved, that is the utilisation of the alpha acids from the resin extract to the finished beer is more than 86%. According to German Patent Application No. P 28 27 002, the average yield of alpha acids of an extract obtained with $CO_2$ as solvent amounts to 96.5% (average taken from Example 1 to 3). Correspondingly, the utilisation of alpha acids from the hops to the finished beer is 86%.

A further surprise is caused by the finding that during pressure treatment and isomerisation by the fluid $CO_2$ undesirable ingredients of the starting product such as e.g. high-molecular esters and waxes are dissolved and are discharged during extraction by the carbonic acid, due to which subsequent purification of the crude isohumulons obtained is substantially simplified and undesirable gushing of the beer is avoided.

The optional preparation of reduced iso-alpha acids, as effected by the use of the above-mentioned hydrides, resulted in no further reduction of yield by the process according to the invention. In contrast thereto, with the known process of hydrogenation of the iso-alpha acids with metal hydride the efficiency of the iso-alpha acids is reduced by about 15%.

The process according to the invention also avoids the disadvantages, as presented by the known processes of pressureless hydrogenation, where non-bittering, so-called Carson isohumulons are formed which do not occur in the process according to the invention.

It is also important to find that with the process according to the invention a substantially better stability in storage of the iso-alpha acids obtained is achieved. Whereas, for example a 30% aqueous iso-alpha acid solution can be stored for only about 6 months without noticeable losses of iso-alpha acids, the stability in storage of a 50% powdery iso-alpha product prepared according to the invention amounts to several years.

The process according to the invention is explained hereinafter by reference to the drawing which shows schematically an installation for the preparation of an isomerised hop extract:

A $CO_2$ extract is prepared in the left part of the installation, while the right part is devoted to isomerisation of the alpha acids. The extract to be obtained in the left part of the apparatus can be used for further processing to oestrogen-active substances or, if the isomerisation of alpha acids is desired, the installation shown in the right part is also employed. The hop products are introduced through the funnel 1 and are subsequently crushed in a crushing machine 2, for example a hammer mill, until the cuticula of the lupulin seeds is torn open and the lupulin becomes freely accessible. The hop products thus processed are then feed via a valve lock 3 into a reaction vessel 4. This reaction vessel is a closed high-pressure container designed for high pressures. Provided in the container is a filter 5 and an outlet pipe 6 which is closed by a valve 7 and which enables the extracted hop residues to be removed. If work is carried out continuously, this valve 7 can be designed as a pressure lock. $CO_2$ is supplied to this high-pressure container 4 from a supply container 8 and is brought to the desired working pressure in a compressor 9 and introduced into the reaction container 4 via a valve 10. The fluid $CO_2$ enriched with alpha acids is then conveyed via an expansion valve 11 from the reaction container 4 into the expansion container 12.

In this expansion container 12 the extract containing alpha acids is precipitated and is then taken off through the pipe 13. The expanded $CO_2$ is purified and regenerated in a device 14 known per se and is then returned to circulation via a valve 15. The extract which contains alpha acids and is taken from the expansion container 12 by the pipe 13 provided with a valve 16 is delivered to a mixer 17 to which one or more adsorption agents or optionally metal hydrides are added, as suggested by the arrow 18. In the mixer 17 the material is mixed dry and is then delivered via the pipe 20 provided with a valve 21 to the reaction container 19 which is designed as a high-pressure container like the reaction container 4. In this reaction container isomerisation is effected under high $CO_2$ pressure, the $CO_2$ being taken from the supply container 8, brought up to pressure in a compressor 22 and then conveyed to the reaction container 19 via the pipe 23 and the valve 24. The isomerised extract is then removed via a lock 25 and conveyed into a racking vessel 26. Optionally, the removed extract is purified at 27 by means of gel filtration or treatment with an ion exchanger resin. From the reaction container 19 a pipe 28 leads via an expansion valve 29 into an expansion container 30 in which the non-isomerised fractions are precipitated. These ingredients free of iso-alpha acids are then returned again to the mixer 17 via the pipe 31 and the expanded carbonic acid is conveyed through the circuit to the supply container 8 via the pipe 32 and the valve 33.

The following Examples illustrate the invention. The kw value refers to the value determined by conduction measurement and the dc value refers to the value determined by thin-lay chromatography.

EXAMPLE 1

1 kg of lupulin-enriched hop powder in pellet form, alpha content 11.2% wfr, water content 7.2%, was introduced into the pressurised container 4 and extracted with $CO_2$ for 2 hours at a pressure of 115 bars and a temperature of 23.2° C. After extraction had been effected, 361 g of gold-yellow hop extract were removed from the pressurised container 9 at the withdrawal valve. The analysis of the starting product and of the extract obtained was as follows:

|  | Starting point | Extract 1 |
|---|---|---|
| Total resin | 34.9% | 99.2% |
| Soft resin | 31.2% | 88.7% |
| Alpha acid kw value | 11.2% | 30.5% |
| Alpha acid dc | 11.0% | 29.6% |
| Beta acid dc | 13.1% | 27.2% |
| Total hop oil | 2.5% | 2.1% |
| All values are percentages by weight, anhydrous | | |
| Water | 7.2% | 3.9% |
| P.I. Index | 1.35 | 0.2 |

EXAMPLE 2

The same hop powder as in Example 1 was extracted in the pressurised container 4 with $CO_2$ for 90 minutes at a pressure of 500 bars and a temperature of 25° C. 354 g of hop extract were removed from the expansion container 4; the analysis was as follows:

|  | Extract 2 |
|---|---|
| Total resin | 98.7% |
| Soft resin | 88.2% |
| Alpha acid kw value | 30.6% |
| Alpha acid dc | 29.5% |
| Beta acid dc | 27.7% |
| Total hop oil | 2.3% |
| All values are percentages by weight, anhydrous | |
| Water | 6.3% |
| P.I. Index | 0.35 |

EXAMPLE 3

1 kg of the same hop as in Examples 1 and 2 was mixed with 333 g of water so that the water content of the pellets was 40.5% and it was extracted in the pressurised container 4 with $CO_2$ for 2 hours at a pressure of 140 bars and a temperature of 20° C. After completion of extraction 365 g (air-dry extract) were obtained and the analysis was as follows:

|  |  |
|---|---|
| Total resin | 94.4% |
| Soft resin | 84.4% |
| Alpha acid kw value | 28.8% |
| Alpha acid dc | 27.9% |
| Beta acid dc | 26.2% |
| Total hop oil | 2.0% |
| All values are percentages by weight, anhydrous | |
| Water | 8.5% |
| P.I. Index | 0.88 |

EXAMPLE 4

100 g of hop resin extract obtained by extraction with $CO_2$ as solvent (alpha acid content 44.3 g relative to anhydrous substance) are mixed intensively with 443 g of bentonite (anhydrous) in a kneader.

The moisture content of the mixture is 5.2%. This mixture is treated for 1½ hours in a closed high-pressure container at a pressure of 250 bars and a temperature of 90° C. with fluid $CO_2$. The quantity of flow of $CO_2$ is 8 kg/h.

After completion of the test 0.5 g of hop resin extract relative to anhydrous substance are found in the expansion container.

The iso-alpha acid content of the extract in the expansion container is 0%. In the reaction container 42.1 g of iso-alpha acids are found to be bound to bentonite (relative to anhydrous substance).

This corresponds to a yield of 95.03% for the alpha acids reacting in the reaction container and of 96% relative to the alpha acids in the expansion container which are to be used again.

EXAMPLE 5

100 g of hop resin extract obtained by extraction with dichloromethane as solvent (alpha acid content 42.1 g relative to anhydrous substance) are mixed intensively in a kneader with 21 g of $Na_2CO_3$ (anhydrous) and 21 g of sodium borohydride (anhydrous).

The moisture content of the mixture is 12.4%. The mixture is treated with fluid $CO_2$ for 30 minutes in a closed high-pressure container at a pressure of 65 bars and a temperature of 98° C. The rate of flow of $CO_2$ is 4 kg/h.

After completion of the test no hop resin extract is found in the expansion container.

In the reaction container 39.8 g of iso-alpha acids (anhydrous) are found to be bound to $Na_2CO_3$ and sodium borohydride. The yield of crude iso-alpha acid is 94.5%.

Purification of these crude isohumulons is effected by known methods with the aid of ion-exchanger chromatography.

The alpha acids and iso-alpha acids are determined by means of the method described by Otter-Silvester-Taylor (J. Inst. Brewing 1972, 78 57).

EXAMPLE 6

250 mg of iso-alpha acids bound to bentonite and prepared under the conditions of Example 4 are added to 10 liters of beer having a basic bitterness of 12 ppm. After brief stirring and a reaction time of 15 hours the beer is filtered.

The measured bitterness of the filtered beer is now 35.3 ppm.

The flavour of the beer is satisfactory, it shows no increase in the turbidity values and there is no undesirable gushing upon opening of the containers.

The binding of the iso-alpha acids to adsorption agents such as e.g. bentonite proves especially advantageous with regard to the homogeneous distribution in the beer of the iso-alpha acids added.

I claim:

1. A process for the isomerization of alpha acids contained in a hop extract which is obtained by extracting hops or hop products with liquid or fluid $CO_2$ or organic solvents which comprises mixing said extract with one or more adsorption agents selected from the group consisting of bentonite, fuller's earth and alkali and alkaline earth metal salts or oxides, treating the mixture so formed in a closed pressurized container with fluid $CO_2$ under a pressure of greater than 50 bars and at a temperature of greater than 33° C. whereby iso-alpha acids are formed with essentially no dissolving of the iso-alpha acids in the fluid $CO_2$ and removing from the pressurized container the iso-alpha-acids thus obtained as a dry substance.

2. A process as claimed in claim 1 wherein the isomerisation is effected at a pressure of from 200 to 350 bars.

3. A process as claimed in claim 1 wherein the isomerisation is effected at a temperature of greater than 80° C.

4. A process as claimed in claim 1 or 2 or 3 wherein the treatment with $CO_2$ in the pressurised container is effected for at least 5 minutes.

5. A process as claimed in claim 1 wherein the alkali and alkaline earth metal salts or oxides are selected from the group consisting of $Na_2CO_3$, $K_2CO_3$, $MgCO_3$, $CaCl_2$, calcium oxide and magnesium oxide.

6. A process as claimed in claim 1 wherein the ratio of adsorption agents to alpha acids is from 1:0.01 to 1:10 by dry weight.

7. A process as claimed in claim 1 wherein a further adsorption agent in the form of reducing agent is added.

8. A process as claimed in claim 7 wherein the reducing agent is a borohydride or an alkaline earth metal hydride.

9. A process as claimed in claim 7 or 8 wherein the weight ratio of the further adsorption agent alone or together with the adsorption agent to the alpha acids of the hop extract is 1:0.01 to 1:10.

10. A process as claimed in claim 1 wherein the water content of the material in the pressurised container is from 0 to 100% based on the dry weight of the material.

11. A process as claimed in claim 1 wherein the hop product is crushed, ground, split or pressed lupulin seeds.

12. A process as claimed in claim 1 wherein the iso-acids obtained are purified by gel chromatography or by using an ion-exchange resin.

13. A process as claimed in claim 1 wherein the iso-acids obtained are subsequently pulverised or granulated.

14. A process for the isomerization of alpha acids contained in a hop extract which is obtained by extracting hops or hop products with carbon dioxide at a temperature up to the critical temperature of carbon dioxide and at a pressure above the critical pressure of carbon dioxide which comprises mixing said extract with one or more adsorption agents selected from the group consisting of bentonite, fuller's earth and alkali and alkaline earth metal salts or oxides, treating the mixture so formed in a closed pressurized container with fluid $CO_2$ under a pressure of greater than 50 bars and at a temperature of greater than 33° C. whereby iso-alpha acids are formed with essentially no dissolving of the iso-alpha acids in the fluid $CO_2$ and removing from the pressurized container the iso-alpha-acids thus obtained as a dry substance.

* * * * *